Patented May 18, 1948

2,441,827

UNITED STATES PATENT OFFICE 2,441,827

EXTRACTION PROCESS

Art McKinnis, Los Angeles, Calif., assignor to Union Oil Company of California, Los Angeles, Calif., a corporation of California No Drawing. Application October 27, 1943, Serial No. 507,872

17 Claims. (Cl. 196—14.35)

This invention relates to the preparation of pure hydrocarbons from complex hydrocarbon mixtures whose components have small differences in boiling points which renders them inseparable by ordinary fractional distillation. More particularly it relates to methods of treatment of a complex hydrocarbon mixture to cause the separation of relatively unsaturated or olefinic hydrocarbons or of aromatic hydrocarbons from relatively saturated or paraffinic hydrocarbons or naphthene hydrocarbons.

An object of this invention is to provide a means of separating individual hydrocarbons or hydrocarbon components from complex hydrocarbon mixtures.

Another object of the invention is to separate one or more hydrocarbons or classes of hydrocarbons, such as paraffins, naphthenes, olefins, diolefins and aromatics, from a hydrocarbon fraction containing two or more different classes of hydrocarbons, said hydrocarbon fraction being normally gaseous or normally liquid and preferably having a narrow boiling temperature range.

Another object of the invention is to separate relatively olefinic hydrocarbons from relatively non-olefins hydrocarbons having approximately the same boiling point range and particularly to separate the diolefins from mono-olefins and paraffins in the case of relatively narrow boiling fractions containing these hydrocarbons, said fractions being those such as may be obtained by the fractional distillation of the products of petroleum cracking or dehydrogenation processes.

Another object of the invention is to separate aromatic hydrocarbons from non-aromatic hydrocarbons having approximately the same boiling points or boiling point range.

It is also an object of my invention to separate mixtures of two or more hydrocarbons which form minimum boiling point azeotropes thus preventing separation by ordinary fractional distillation processes.

The difficulty in separating hydrocarbons having similar boiling points is well recognized and many methods for effecting such separations have been suggested including chemical processes, highly efficient fractional distillation processes, azeotropic distillation processes and solvent extraction processes, both liquid phase and vapor phase solvent extraction processes. This invention is concerned with the solvent extraction processes and particularly with improvements in these processes.

According to my invention the separation of a specific hydrocarbon or hydrocarbon component from a mixture of hydrocarbons, from a hydrocarbon fraction whose components have substantially the same boiling points or from a mixture of two or more hydrocarbons which form a constant boiling point azeotrope, is accomplished by extracting said mixture or fraction with a solvent, such as a nitrile or an organic cyanide. The solvent extraction may be effected in the liquid phase by thoroughly mixing an appropriate amount of a nitrile with the hydrocarbon mixture or fraction, allowing the mixture to separate into two liquid phases and separating the two phases as by decantation. The solvent extraction may also be effected in the vapor phase in which case the liquid solvent may be passed countercurrently to the vaporized hydrocarbon mixture or fraction in a vessel such as a fractionating column designed to cause the hydrocarbon vapors to be contacted and scrubbed by the solvent. This vapor phase solvent extraction may be considered to be extractive distillation and will be referred to as such hereinbelow.

The efficiency and the completeness of the separation effected by such extraction in either the liquid or vapor phase is influenced by and dependent upon both the selectivity and the solvent power of the nitrile used as solvent and these characteristics vary with the hydrocarbon mixture to be treated and with the particular nitrile. Thus the nitrile employed must be sufficiently selective in its solvent action to dissolve at least one hydrocarbon or hydrocarbon component of a hydrocarbon mixture or fraction without dissolving substantial quantities of at least one hydrocarbon or hydrocarbon component different from said first named hydrocarbon or hydrocarbon component. Moreover, the nitrile must be capable of dissolving substantial quantities of said first named hydrocarbon or hydrocarbon component in order that the extractive treatment may be effectively completed in a relatively small number of operations and therefore be reasonably economical.

The term nitrile as used hereinbelow includes organic compounds containing at least one cyano group or radical per molecule. This radical may be represented by the formula —C≡N. Thus nitriles which I may employ as solvents in my treating process include the mononitriles having the general formula R—C≡N where R is a monovalent alkyl, alkenyl or cycloalkyl radical. Compounds which are representative of these classes of mononitriles include acetonitrile, propionitrile, butyronitrile, valeronitrile, etc., up to and including stearonitrile, and thus containing between 2 and about 18 carbon atoms per molecule, as well as the isomeric or branched chain alkyl nitriles, such as isobutyronitrile, methylbutyronitrile, α,α-dimethyl propionitrile, isocapronitrile, isovaleronitrile, etc. The alkenyl nitriles or the unsaturated aliphatic nitriles corresponding to the above disclosed saturated or alkylnitriles may also be employed. Thus I may use acrylonitrile, crotononitrile, vinylacetonitrile, alkylacetonitrile, etc. Examples of the cycloalkylnitriles which may be employed include cyclopentylcyanide, cyclohexylcyanide, cyclopentyl and cyclohexylacetonitrile and alkyl substituted cycloalkylnitriles, such as methyl cyclopentylcyanide and methylcyclohexylcyanide and the higher homologs of these compounds.

I may also employ dinitriles which may be represented by the general formula R'(C≡N)₂, where R' is a divalent organic radical, such as an alkylene, a cycloalkylene or a phenylene radical. Examples of dinitriles which I may use are malononitrile, succinonitrile, glutaronitrile, adiponitrile, etc., dicyanocyclohexane, dicyanobenzene, etc.

Other nitriles which I may employ are those organic compounds containing one or more atoms of oxygen or sulfur together with one or more cyano radicals per molecule. Compounds of this type may be prepared by reacting acrylonitrile or the alkyl, alkenyl, cycloalkyl or aryl substituted acrylonitriles with water, hydrogen sulfide, mono or polyhydroxy alcohols, phenols and mercaptans. These reactions may be represented by the following general equations:

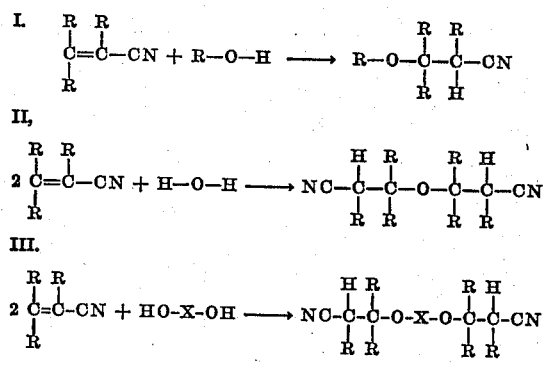

where O represents oxygen or sulfur, R represents hydrogen or a monovalent alkyl, alkenyl, cycloalkyl or aryl radical and X represents a divalent aliphatic radical which may contain a divalent element such as oxygen or sulfur in the carbon chain such as

—CH₂—CH₂—, —CH₂—CH₂—O—CH₂—CH₂—,

—CH₂—CH₂—S—CH₂—CH₂—, etc., or a divalent cycloalkyl or aromatic radical. Examples of the products of reaction I, i. e., the reaction between acrylonitrile and a monohydroxy alcohol, a phenol or a mercaptan, include the alkoxy propionitriles, such as methoxypropionitrile, ethoxypropionitrile, propoxypropionitrile, etc.; the corresponding sulfur compounds, such as methylmercaptopropionitrile, ethylmercaptopropionitrile, propylmercaptopropionitrile, etc., phenoxypropionitrile, cresyloxypropionitrile, benzyloxypropionitrile, phenylmercaptopropionitrile, benzylmercaptopropionitrile, etc. Examples of the products of reaction II, i. e., the reaction between acrylonitrile and water or hydrogen sulfide, include dicyanodiethylene glycol and dicyanodiethylsulfide. The products of reaction III, i. e., the reaction between acrylonitrile and polyhydroxy alcohols or polythio alcohols, include dicyanotriethylene glycol, the dicyanopolyethylene glycols and the corresponding sulfur compounds which may be referred to as dicyanopolyethylpolysulfides. The products of reactions II and III are dicyanoethers for they contain two —CN groups and ether linkages. These reaction products which contain sulfur ether linkages are referred to as dicyanothioethers and obviously those which contain oxygen ether linkages and do not contain sulfur ether linkages are referred to as dicyanooxyethers.

The above compounds containing oxygen and sulfur in addition to cyano groups fall in the class of nitriles. These particular compounds may, however, be defined for the purpose of this description as the reaction products of an acrylonitrile and an alcohol. It is to be understood that by the term an acrylonitrile is meant to include the substituted acrylonitriles and by the term alcohol is meant to include water, hydrogen sulfide, mono and polyhydroxy alcohols, mercaptans and phenols. These compounds may be classified under the general term cyano ethers and by this term is meant to include both the oxygen ethers and the thio ethers and also double or multiple ethers, i. e., where more than one oxygen or sulfur linkage is present in each molecule.

The selection of a particular nitrile for use as solvent in any case will depend upon the particular mixture or fraction of hydrocarbons to be treated and upon the particular hydrocarbon or hydrocarbon component which is to be separated. Moreover the selection will depend upon whether the extraction is to be effected in the liquid or in the vapor phase since the requirements of solvent power, selectivity and boiling point of the solvent are somewhat different for each of these types of extraction.

In the case of liquid phase extraction the solvent may have a boiling point above or below the boiling point range of the hydrocarbon mixture or fraction to be treated. Thus the boiling point of the nitrile will be at least 25° F. and preferably 50° F. below the initial boiling point, or it will be 25° F. or preferably 50° F. above the maximum boiling point of the hydrocarbon mixture or fraction. In other words, the boiling point of the nitrile will be at least 25° F. and preferably 50° F. outside of the boiling point range of the hydrocarbon mixture to be treated.

In the case of vapor phase extraction or extractive distillation the nitrile used as solvent should have a boiling point higher than the maximum boiling point of the hydrocarbon mixture in order that the solvent will remain as a liquid under the conditions of temperature and pressure employed during the extraction whereas the hydrocarbon mixture will be at least partially vaporized. In this case the boiling point of the nitrile should be at least 25° F. above and preferably 50° F. or more above the maximum boiling point of the hydrocarbon mixture or fraction being treated.

The advantages to be gained by using my method of treatment for the separation of hydrocarbons are directly attributable to the properties and characteristics of the nitriles which I use as solvents. These compounds are relatively stable and non-reactive with hydrocarbons under the conditions employed and furthermore they are not corrosive to ordinary extraction equipment or to distillation equipment in which vapor phase treatment is effected. Moreover, the nitriles are unusually selective in their ability to dissolve and extract certain hydrocarbons or hydrocarbon components of a hydrocarbon mixture without dissolving other components thus making possible the separation of hydrocarbons by the use of relatively small proportions of solvent and/or relatively few extraction stages.

The amount of solvent to be employed in any case will be dependent upon the particular hydrocarbon fraction being treated, the particular nitrile used as the extractive solvent and upon the extraction equipment in which the treatment is carried out. Thus in the case of liquid phase extraction it will depend upon the type of process employed, i. e., batch, multiple batch, batch countercurrent, or continuous countercurrent extraction, as well as upon the number of extraction stages and the efficiency of the process. In the case of extractive distillation the amount of solvent to be employed will depend upon the efficiency of the fractionating equipment. Generally, as the ratio of solvent to hydrocarbon is increased the efficiency of the extraction increases although at the same time the effective capacity of the equipment decreases. Thus in any given case there is an ideal ratio of solvent to hydrocarbon, smaller ratios producing less efficient separation and larger ratios being less economical. While I may use any ratio of solvent to hydrocarbon which is great enough to produce the desired separation I prefer to employ weight ratios of from about 0.5:1 to about 20:1, respectively.

The nitriles which I use as solvents, when mixed with or otherwise allowed to contact a mixture of hydrocarbons, have the effect of dissolving relatively unsaturated hydrocarbons to a greater extent than relatively saturated hydrocarbons contained in said mixture of hydrocarbons. For the purposes of this description, by the term relatively unsaturated hydrocarbons is meant those hydrocarbons having relatively low hydrogen to carbon ratios, and specifically those having the general formula $C_nH_{2n-2}$ or diolefins and cyclodiolefins, $C_nH_{2n-4}$ or cyclodiolefins and $C_nH_{2n-6}$ or aromatics and will include also those hydrocarbons having even lower ratios of hydrogen to carbon such as naphthalene and naphthalene homologs, as well as the higher molecular weight unsaturated petroleum hydrocarbons such as are found in gas oil and lubricating oil fractions of petroleum. By the term relatively saturated hydrocarbons is meant to include those hydrocarbons having relatively high hydrogen to carbon ratios and specifically those hydrocarbons having the general formulas $C_nH_{2n+2}$ or the paraffins and $C_nH_{2n}$ or the monoolefins and the naphthenes.

Thus hydrocarbon mixtures comprising paraffins and diolefins; monoolefins and diolefins; or paraffins, monoolefins and diolefins may be extracted with a sufficient amount of an appropriate nitrile to dissolve and/or extract the diolefins thereby leaving undissolved the hydrocarbons other than diolefins. Likewise, hydrocarbon mixtures comprising paraffins and aromatics; naphthenes and aromatics; monoolefins and aromatics; paraffins, naphthenes and aromatics; paraffins, monoolefins and aromatics; or naphthenes, monoolefins and aromatics may be extracted with a sufficient amount of an appropriate nitrile to dissolve and/or extract the aromatic hydrocarbons thereby leaving undissolved the hydrocarbons other than aromatics.

It is also possible to separate hydrocarbon mixtures comprising cycloolefins or diolefins and relatively saturated hydrocarbons by extraction with a nitrile. In those cases the cycloolefin or cyclodiolefin is dissolved by the nitrile and the relatively saturated hydrocarbons remain undissolved.

Although monoolefins have been classed with the paraffins and naphthenes as relatively saturated hydrocarbons their solubility in nitriles is relatively greater than that of the paraffins or the naphthenes and it is possible to separate mixtures comprising paraffins and monoolefins or naphthenes and monoolefins by solvent extraction with a nitrile.

Although hydrocarbons in the lower molecular weight ranges can be successfully classified as above indicated into paraffins, naphthenes, cycloparaffins, monoolefins, diolefins, aromatics, etc., the higher molecular weight hydrocarbons such as those which make up lubricating oil and like fractions of petroleum cannot be successfully classified in this manner. Lubricating oil fractions do contain relatively saturated hydrocarbon components and relatively unsaturated hydrocarbon components and again for the purpose of this description the term relatively saturated hydrocarbon components of such high molecular weight hydrocarbon fractions will refer to those components having a high V. I. (viscosity index, Dean and Davis system) and/or a low V. G. C. (viscosity gravity constant) as described by Hill and Coats in the Industrial and Engineering Chemistry, vol. 20, 1928, pages 641 to 644. The term relatively unsaturated hydrocarbon will refer to those hydrocarbon components having a relatively low V. I. and/or a relatively high V. G. C. Thus it is possible to separate the high V. I., low V. G. C. components of a lubricating oil fraction from the low V. I., high V. G. C. components by extracting said fraction with a nitrile which dissolves the last named components leaving the first named components substantially undissolved.

In the treatment of waxy lubricating distillates it is within the scope of my invention to combine my extraction process with a dewaxing process to produce high quality lubricating oils having high V. I., low V. G. C., and low pour points. For this purpose any conventional dewaxing process may be employed. I may first dewax the lubricating distillate and then extract the dewaxed distillate with a nitrile or I may first extract the lubricating distillate with a nitrile and subsequently dewax the raffinate from the extraction operation. Since the wax present in the lubricating distillate consists of relatively saturated hydrocarbon molecules it is insoluble in the nitrile and remains in the raffinate phase from which it is removed by the dewaxing operation.

It is preferable that the hydrocarbon mixtures or fractions to be treated by my extraction process have a relatively narrow boiling temperature range because in general the efficiency of the treatment increases as the boiling range decreases. This is particularly true in the case of relatively low molecular weight hydrocarbon fractions although the same principle applies in the case of high molecular weight fractions. Moreover, it is highly desirable that the fraction have a relatively narrow boiling temperature range when the extraction is to be effected in the vapor phase because in this case the separation is dependent not only upon the solvent action of the nitrile but also upon the relative vapor pressures of the hydrocarbons or hydrocarbon components of the fraction in the presence of the nitrile.

The liquid or vapor phase extractions may be effected at any desired pressure, the particular pressure employed in any given case being dependent in part upon the boiling temperature range of the hydrocarbon mixture being treated and upon the boiling point of the nitrile used as solvent. Pressure is not as critical in the case of liquid phase extraction as in the case of extractive distillation in that for most purposes normal atmospheric pressure is entirely satisfactory for liquid phase extraction whereas in the case of vapor phase extraction widely different pressures may be desirably employed. Thus when extractively distilling hydrocarbon fractions comprising $C_4$ hydrocarbons it is usually desirable to operate under pressures in the order of about 80 to 100 pounds per square inch gage and in some instances even much higher pressures are employed, such as for example about 300 pounds per square inch, although when treating hydrocarbon fractions comprising $C_6$ hydrocarbons it is usually preferred to operate at ordinary atmospheric pressures. In the case of treating higher molecular weight hydrocarbon fractions it is often desirable to operate under a vacuum as high as about 29 inches of mercury so that the distillation may be effected at temperatures below those at which decomposition or cracking may occur. I may therefore effect my solvent extraction at pressures ranging from about 29 inches of mercury vacuum to about 300 pounds per square inch gage pressure or even higher.

In effecting the liquid phase solvent extraction using an appropriate nitrile the hydrocarbon mixture or fraction is mixed or contacted with the nitrile and the resulting mixture is allowed to separate into two phases as indicated hereinabove. These phase are separated mechanically, as by decantation. The upper or raffinate phase, comprising relatively saturated hydrocarbons is freed from a small amount of the nitrile which is dissolved therein by any convenient method such as by a distillation process. If the boiling point of the nitrile is below the initial boiling point of the hydrocarbon or hydrocarbon mixture the nitrile vaporizes leaving the hydrocarbon as a residue. If the nitrile boils at a temperature above the maximum boiling point of the hydrocarbon or hydrocarbon component then the distillation results in vaporizing the hydrocarbon thereby leaving the nitrile as a residue. The lower or extract phase, comprising the major part of the nitrile together with the relatively unsaturated hydrocarbons is separated as by distillation, vaporizing the nitrile or the hydrocarbon depending upon the relative boiling points of the two components thereby leaving the other component as a residue.

The above described operation is a batch operation, however, I may employ multiple batch, batch countercurrent, or continuous countercurrent methods all of which are well known to those skilled in the art.

Vapor phase solvent extraction or extractive distillation is preferably effected by passing the hydrocarbon mixture, as a liquid or as a vapor, into a fractionating column at a point below about the middle of the column and passing the liquid solvent into the same column at a point above the point of entry of the hydrocarbon mixture and preferably at a point near the top of the column. Heat is supplied to the column by means of heating the incoming hydrocarbon stream and/or by means of a reboiler at the base of the column, the temperature being controlled at such a level that at least one hydrocarbon or hydrocarbon component is vaporized and distills overhead from the column. The solvent flows downwardly through the column contacting and scrubbing the ascending hydrocarbon vapors and carrying with it those hydrocarbons present in the hydrocarbon mixture which are the most soluble in the nitrile and which have the lowest vapor pressure in the presence of the solvent. This mixture of solvent and hydrocarbons is withdrawn from the bottom of the column and transferred to a second column where it is distilled at a somewhat higher temperature to vaporize the hydrocarbons, thereby leaving the solvent as a distillation residue. This solvent may be recycled to the extractive distillation column.

The above described extractive distillation process is the preferable method for effecting vapor phase extraction, however, I may employ other means. For example, I may use a flash type distillation in which the mixture of hydrocarbons and nitrile is passed through a heated zone where the mixture is substantially completely vaporized and the vapors are led into a fractionating column which is maintained at a temperature such that the solvent and at least one of the hydrocarbons or hydrocarbon components of the vaporized mixture are condensed and flow downwardly through the column and at least one of the hydrocarbons or hydrocarbon components remains as a vapor and ascends the column. The temperature in the column may be controlled by regulating the temperature of the feed to the column or by using a reboiler at the bottom of the column or both. In this type of distillation the solvent, due to its appreciably higher boiling point condenses first and the thus formed liquid solvent contacts the vapors of the hydrocarbon mixture being treated.

The following specific examples serve to illustrate further the invention, but they are not to be taken as in any way limiting the invention.

*Example I*

A mixture of $C_4$ hydrocarbons comprising 40 parts by weight of butadiene, 30 parts by weight of butenes, and 30 parts by weight of butanes is passed into a fractionating column maintained at a pressure of 80 pounds per square inch gage at a point near the bottom of the column. Acetonitrile, which is used as the solvent, is passed into the same column at a point near the top of the column at the rate of 4 parts by weight of acetonitrile to 1 part by weight of the $C_4$ hydrocarbon mixture. At a still-head temperature of 128° F. the butenes and butanes are vaporized and pass as overhead distillate from the column. The butadiene and acetonitrile, substantially completely separated from butanes and butenes, are removed as undistilled residue from the column. This residue is passed to a second fractionating column operated under the same pressure but at a somewhat higher temperature where the butadiene vaporizes and distills leaving acetonitrile as the residue.

*Example II*

A mixture of hydrocarbons boiling in the temperature range of about 200° F. to about 250° F. and comprising 50 parts by weight of toluene and 50 parts by weight of non-aromatic hydrocarbons is passed into a fractionating column at a point near the bottom of the column. The column is maintained at normal atmospheric pressure and at a still-head temperature of 252° F. Methylmercaptopropionitrile, which is used as solvent, is passed into the same fractionating column at a point near the top of the column at the rate of 15 parts by weight of methylmercaptopropionitrile to 1 part by weight of the hydrocarbon mixture entering the column. Under these conditions the non-aromatic hydrocarbons distill and are obtained as an overhead fraction and a mixture of toluene and methylmercaptopropionitrile, substantially completely separated from non-aromatic hydrocarbons, is obtained as a bottoms fraction.

This bottoms fraction is passed to a second fractionating column maintained at the same pressure as the first column where the toluene vaporizes and distills at a still-head temperature of 244.4° F. leaving the methylmercaptopropionitrile as a distillation residue. The methylmercaptopropionitrile obtained in this operation is recycled to the extractive distillation step where it is again used as solvent.

Example III

A mixture of hydrocarbons boiling in the temperature range of about 250° F. to about 300° F. and comprising 50 parts by weight of xylene and 50 parts by weight of non-aromatic hydrocarbons is passed into a fractionating column at a point near the bottom of the column. Phenoxypropionitrile is passed into the same fractionating column at a point near the top of the column at the rate of 15 parts by weight of the phenoxypropionitrile to 1 part by weight of the hydrocarbon mixture entering the column. At a still-head temperature of about 290° F. and at ordinary atmospheric pressure the non-aromatic hydrocarbons vaporize and distill overhead and a mixture of xylene and phenoxypropionitrile, substantially completely separated from non-aromatic hydrocarbons, is obtained as a distillation residue.

This residue is passed to a second fractionating column maintained at the same pressure as the first column where the xylene vaporizes and distills at a still-head temperature of about 290° F. leaving the phenoxypropionitrile as a residue. This residue is recycled to the extractive distillation column where it is again used as a solvent.

Example IV

A mixture of hydrocarbons boiling in the temperature range of about 250° F. to about 300° F. and comprising 50 parts by weight of xylene and 50 parts by weight of non-aromatic hydrocarbons is passed as a liquid into a packed extraction column at a point near the bottom of the column and succinonitrile is passed into the same column at a point near the top of the column at the rate of 7.5 parts by weight of succinonitrile to 1 part by weight of the mixture of hydrocarbons entering the column. The column is maintained at a temperature of about 180° F. and at normal atmospheric pressure.

Raffinate phase is produced from the top of the column at a rate corresponding to 25 parts by weight and extract phase is produced from the bottom of the column at a rate corresponding to 75 parts by weight of the total feed to the column, i. e., hydrocarbon feed and solvent. The raffinate phase comprising non-aromatic hydrocarbons and small amounts of dissolved succinonitrile is passed to a distillation column where the non-aromatic hydrocarbons are vaporized leaving succinonitrile as a residue. The extract phase comprising succinonitrile and xylene, substantially completely separated from non-aromatic hydrocarbons is passed to a second distillation column where the xylene is vaporized leaving succinonitrile as a residue. The combined residues from the distillation of the raffinate and extract phases are returned as solvent to the extraction column.

Example V

A benzene fraction of hydroformed gasoline boiling in the temperature range of about 150° F. to about 200° F. and comprising 50 parts by weight of benzene and 50 parts by weight of non-aromatic hydrocarbons is passed into a packed extraction column at a point near the bottom of the column and dicyanodiethylsulfide is passed into the same column at a point near the top of the column at the rate of 7.5 parts by weight of dicyanodiethylsulfide to 1 part by weight of the benzene fraction. The column is maintained at a temperature of about 150° F. and at ordinary atmospheric pressure.

Raffinate phase is withdrawn from the top of the column at a rate coresponding to 25 parts by weight and extract phase is withdrawn from the bottom of the column at a rate corresponding to 75 parts by weight of the total feed to the column. The raffinate phase comprising non-aromatic hydrocarbons and small amounts of dissolved dicyanodiethylsulfide is passed to a distillation column where the non-aromatic hydrocarbons vaporize and distill leaving dicyanodiethylsulfide as a residue. Similarly, the extract phase comprising dicyanodiethylsulfide and benzene, substantially completely separated from non-aromatic hydrocarbons, is passed to a second fractionating column where the benzene vaporizes and distills leaving dicyanodiethylsulfide as a residue. The residues from both of these distillation operations are combined and returned as solvent to the extraction column.

The foregoing description is not to be taken as in any way limiting but merely as illustrative of my invention for many variations may be made by those skilled in the art without departing from the spirit or the scope of the following claims:

I claim:

1. A method for the treatment of a complex hydrocarbon fraction to separate chemically similar components from other chemically similar components different from said first named chemically similar components contained in said complex hydrocarbon fraction which comprises extracting said complex hydrocarbon fraction with a sufficient quantity of a solvent to dissolve chemically similar components, thereby leaving undissolved other chemically similar components different from said first named chemically similar components, said solvent being a dicyanoether.

2. A method for the treatment of a complex hydrocarbon fraction to separate relatively unsaturated hydrocarbons from relatively saturated hydrocarbons contained therein which comprises extracting said complex hydrocarbon fraction with a sufficient quantity of a solvent to dissolve said relatively unsaturated hydrocarbons thereby leaving undissolved said relatively saturated hydrocarbons, said solvent being a dicyanoether.

3. A method for the treatment of a complex hydrocarbon fraction to separate relatively unsaturated hydrocarbons from relatively saturated hydrocarbons contained in said complex hydrocarbon fraction which comprises extracting said complex hydrocarbon fraction in the liquid phase with a sufficient quantity of a solvent to dissolve said relatively unsaturated hydrocarbons thereby leaving said relatively saturated hydrocarbons undissolved, separating said mixture of solvent and relatively unsaturated hydrocarbons from said relatively saturated hydrocarbons and subsequently separating said solvent from said mixture of solvent and relatively unsaturated hydrocarbons, thereby leaving said relatively unsaturated hydrocarbons substantially completely separated from said relatively saturated hydrocarbons and said solvent, said solvent being a dicyanoether.

4. A method as in claim 3 wherein said dicyanoether is a reaction product between an acrylonitrile and an alcohol.

5. A method for the treatment of a mixture of aromatic and non-aromatic hydrocarbons, the components of which distill in the same temperature range, to separate said aromatic hydrocarbons from said non-aromatic hydrocarbons which comprises extracting said mixture of hydrocarbons with a solvent to produce one fraction comprising said non-aromatic hydrocarbons and another fraction comprising said solvent and said aromatic hydrocarbons and subsequently separating said solvent from said aromatic hydrocarbons, said solvent being a dicyanoether.

6. A method as in claim 5 wherein said extraction is effected in the liquid phase.

7. A method as in claim 5 wherein said extraction is effected in the vapor phase and wherein said solvent has a boiling point at least 25° F. above the maximum boiling point of said mixture of hydrocarbons.

8. A method for the treatment of an aromatic hydrocarbon fraction comprising aromatic and non-aromatic hydrocarbons the components of which distill in the same temperature range to separate said aromatic hydrocarbons from said non-aromatic hydrocarbons which comprises contacting said aromatic hydrocarbon in the liquid phase with a sufficient quantity of a solvent to dissolve said aromatic hydrocarbons, thereby leaving undissolved said non-aromatic hydrocarbons, separating the mixture comprising solvent, aromatic hydrocarbons and non-aromatic hydrocarbons into a raffinate phase comprising non-aromatic hydrocarbons and an extract phase comprising solvent and aromatic hydrocarbons and subsequently treating said extract phase to separate said solvent from said aromatic hydrocarbons, said solvent being a dicyanoether having a boiling point at least 25° F. outside of the boiling point range of said aromatic hydrocarbon fraction.

9. A method as in claim 8 wherein said solvent is a reaction product between an acrylonitrile and a polyhydroxy alcohol.

10. A method as in claim 8 wherein said solvent is dicyanodiethylsulfide.

11. A method for the treatment of a hydrocarbon mixture whose components distill in the same temperature range to separate relatively unsaturated hydrocarbons from relatively saturated hydrocarbons contained therein which comprises extractively distilling said mixture of hydrocarbons in the presence of a sufficient amount of a dicyanoether to dissolve and reduce the vapor pressure of said relatively unsaturated hydrocarbons to a greater extent than that of said relatively saturated hydrocarbons thus permitting the vaporization of said relatively saturated hydrocarbons, thereby leaving said relatively unsaturated hydrocarbons together with said dicyanoether in the residue and subsequently distilling said residue to vaporize said relatively unsaturated hydrocarbons, thereby leaving said dicyanoether in the residue.

12. A method for the treatment of a lubricating oil fraction of petroleum to separate relatively high viscosity index, low viscosity gravity constant components from relatively low viscosity index, high viscosity gravity constant components contained therein which comprises extracting said lubricating oil fraction with a dicyanoether which dissolves said low viscosity index, high viscosity gravity constant components thereby leaving undissolved said high viscosity index, low viscosity gravity constant components.

13. A method as in claim 2 wherein said solvent is a reaction product between an acrylonitrile and a polyhydroxy alcohol.

14. A method as in claim 2 wherein said solvent is a reaction product between an acryonitrile and water.

15. A method as in claim 2 wherein said solvent is a reaction product between an acrylonitrile and hydrogen sulfide.

16. A method as in claim 2 wherein said solvent is a dicyanooxyether.

17. A method as in claim 8 wherein said solvent is a reaction product between an acrylonitrile and hydrogen sulfide.

ART McKINNIS.

REFERENCES CITED

The following references are of record in the file of this patent:

UNITED STATES PATENTS

| Number | Name | Date |
|---|---|---|
| 2,023,375 | van Dijck | Dec. 3, 1935 |
| 2,053,485 | Lindeke et al. | Sept. 8, 1936 |
| 2,143,415 | Hixson et al. | Jan. 10, 1939 |
| 2,159,175 | Mueller-Cunradi et al. | May 23, 1939 |
| 2,162,963 | McKittrick | June 20, 1939 |
| 2,290,636 | Deanesly | July 21, 1942 |
| 2,325,379 | Durrum | July 27, 1943 |

FOREIGN PATENTS

| Number | Country | Date |
|---|---|---|
| 413,307 | Great Britain | July 11, 1934 |
| 441,104 | Great Britain | Jan. 13, 1936 |